Patented Feb. 12, 1952

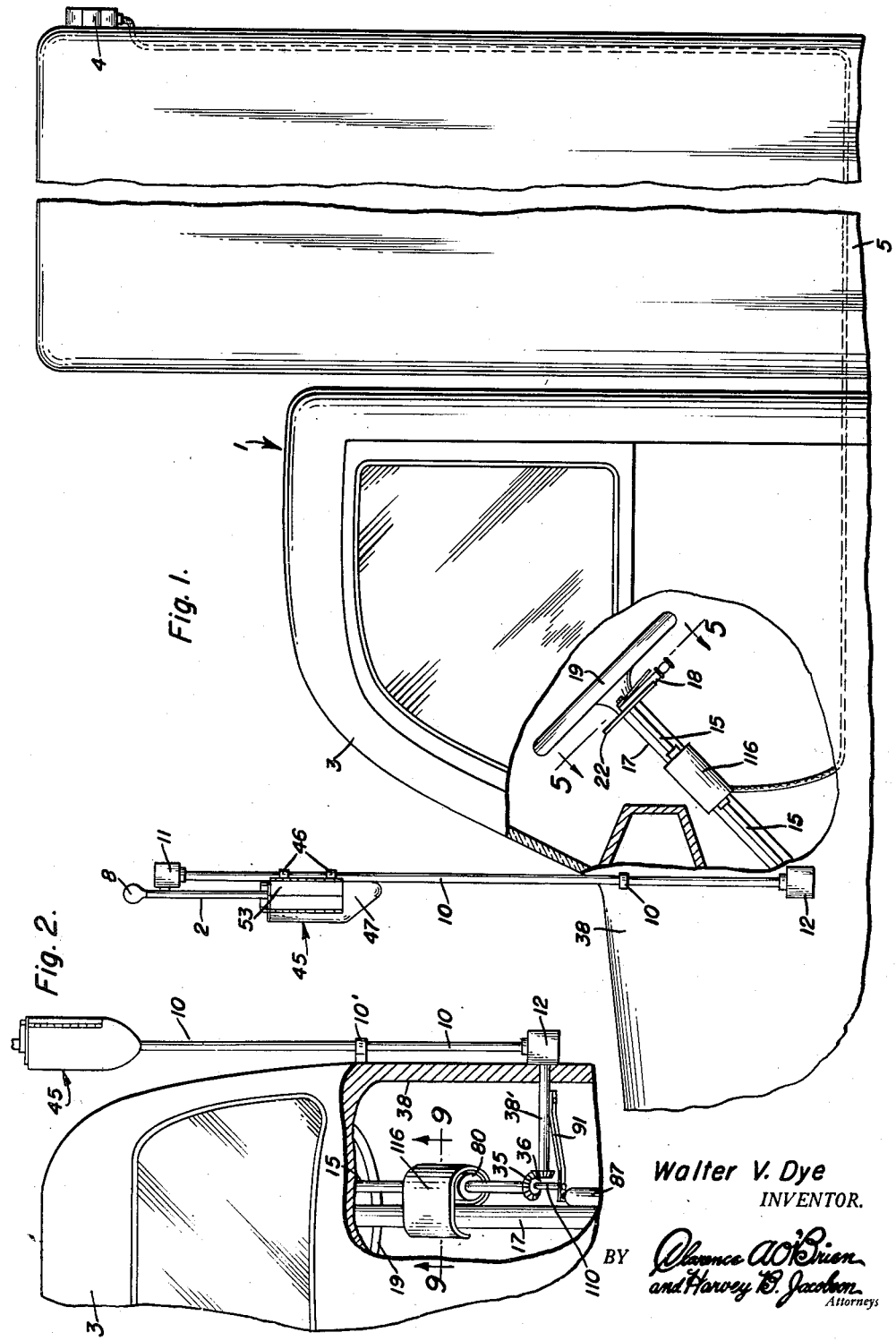

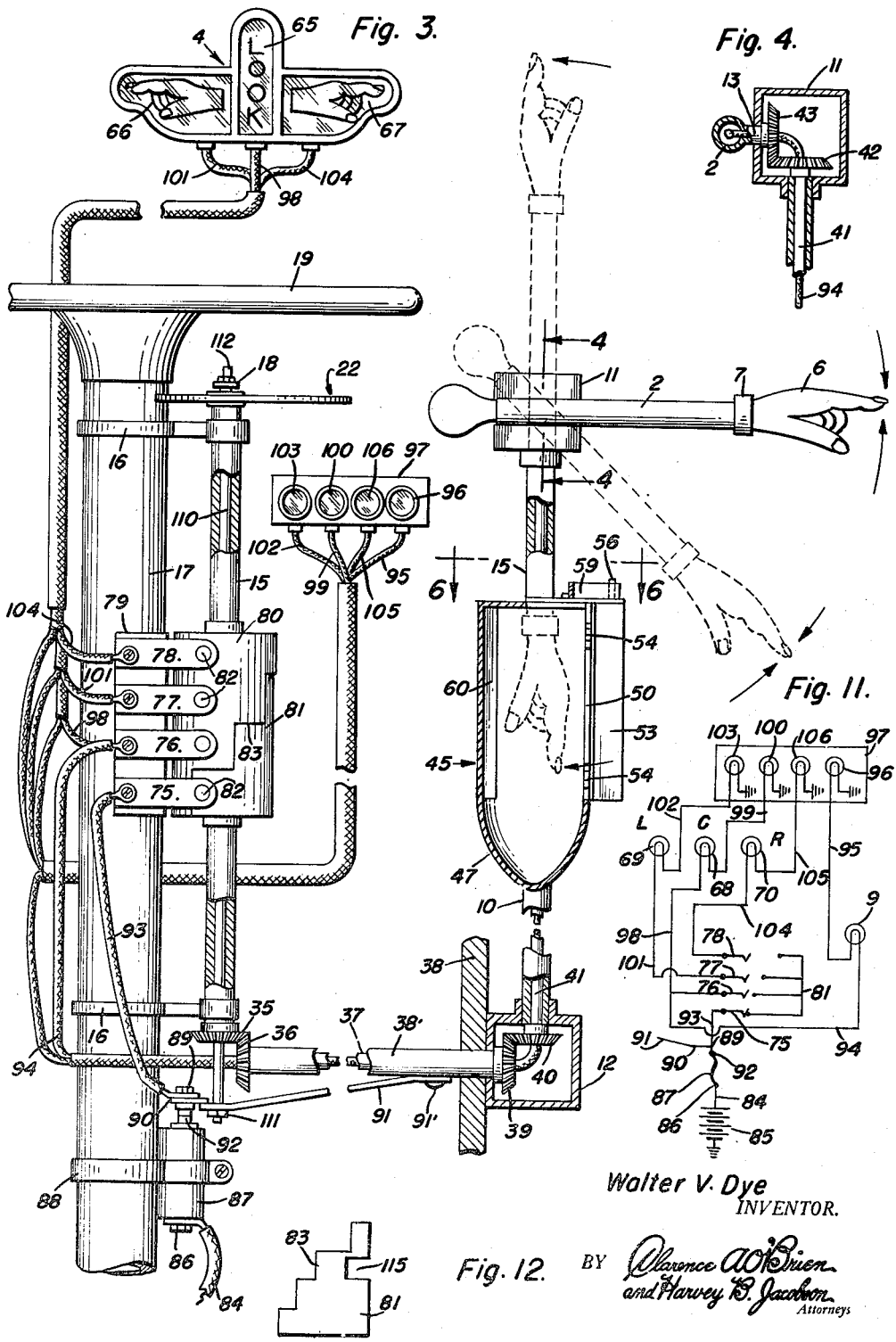

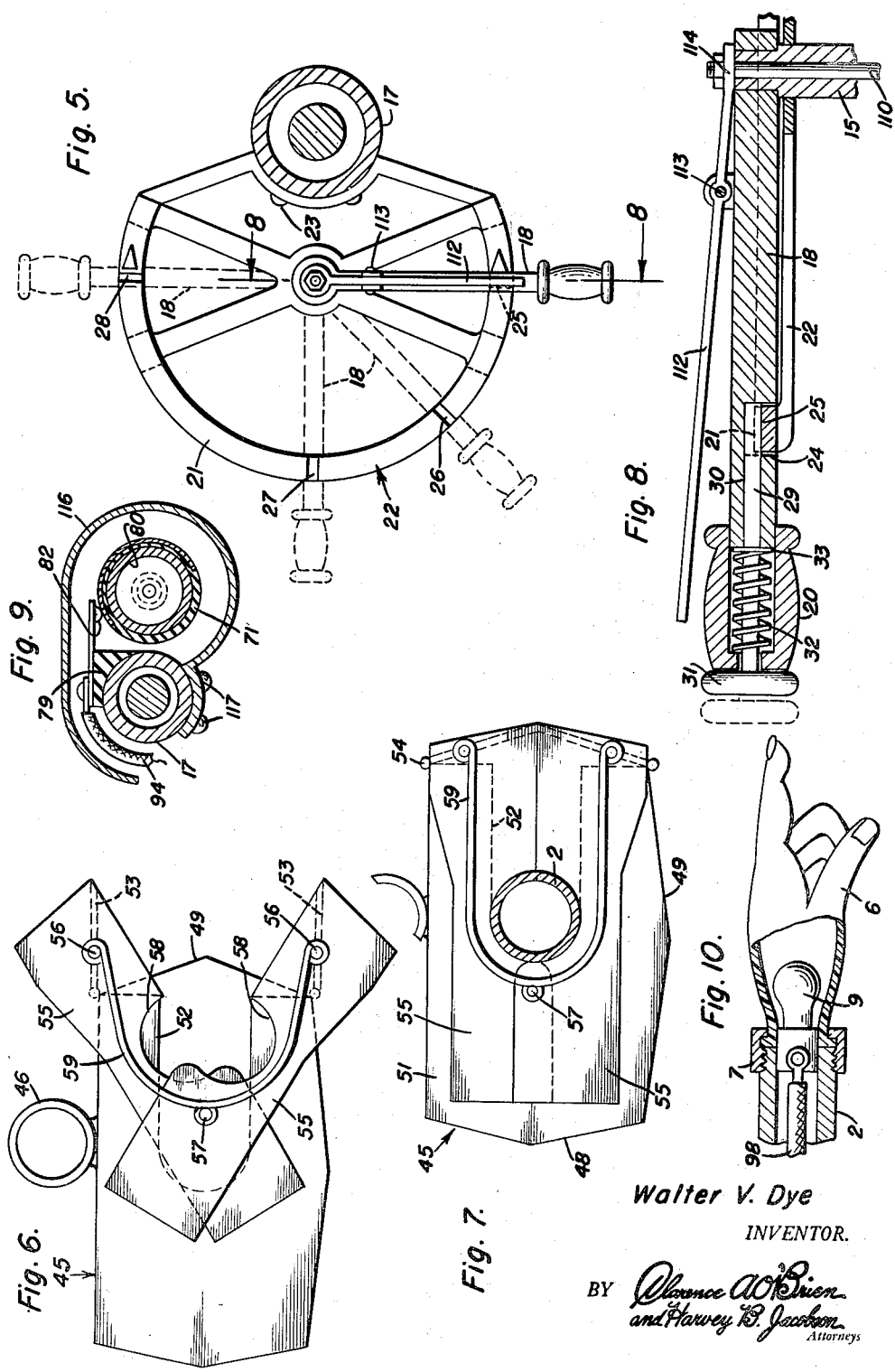

2,584,991

UNITED STATES PATENT OFFICE 2,584,991

DIRECTION AND CAUTION SIGNALING APPARATUS FOR AUTOMOTIVE VEHICLES

Walter V. Dye, Columbia, Tenn.

Application February 3, 1950, Serial No. 142,313

8 Claims. (Cl. 177—327)

My invention relates to improvements in direction and caution signalling apparatus for the front and rear ends of automotive vehicles.

The primary object of my invention is to provide electrically illuminated apparatus of simple form and inexpensive construction for convenient easy operation and control by the driver of an automotive vehicle to give clearly visible signals, either by steady light or flashing light, cautioning drivers in the rear of the vehicle and indicating at both the front and rear of the vehicle right and left turns.

Another object is to provide in conjunction with the above for signalling caution and turns at the front of the vehicle by means of an illuminated hand housed and protected when not in use.

Still another object is to provide apparatus for the purpose above set forth which is adapted to be inexpensively installed on present-day automotive vehicles without necessitating any change in the basic construction of the vehicle and which requires a minimum of servicing, and is dependable and durable.

Other and subordinate objects, within the purview of my invention, together with the precise nature of my improvements, will be readily understood when the succeeding description and claims are read with reference to the drawings accompanying and forming part of this specification.

In said drawings:

Figure 1 is a fragmentary view in side elevation, partly broken away and shown in section, and illustrating my improved apparatus, in the preferred embodiment thereof, installed on an automotive vehicle;

Figure 2 is a fragmentary view in front elevation partly broken away and shown in section of the same;

Figure 3 is a schematic view partly in front elevation and partly in vertical section and drawn to a larger scale;

Figure 4 is a fragmentary view in vertical section taken on the line 4—4 of Figure 3;

Figure 5 is a detail view in horizontal section taken on the line 5—5 of Figure 1 and drawn to a larger scale;

Figure 6 is a view in plan of the housing for the hand drawn to a larger scale with the doors and shutters open;

Figure 7 is a similar view with the doors and shutters closed and the signal arm shown in section in said housing;

Figure 8 is a view in vertical section taken on the line 8—8 of Figure 5 and drawn to a larger scale;

Figure 9 is a view in transverse section taken on the line 9—9 of Figure 2 and drawn to a larger scale;

Figure 10 is a fragmentary view partly in longitudinal section and partly in side elevation, drawn to a larger scale, and illustrating the signal arm and hand; and Figure 11 is a circuit diagram.

Figure 12 is a view of the blank from which the conductor plate is formed.

Referring to the drawings by numerals, my improved signalling apparatus has been shown therein, for the purpose of exemplifying a preferred practice of the invention, as embodied in an automotive truck 1.

My improved apparatus comprises, as its basic components, a vertically swingable front signalling arm 2 mounted, as presently described, in front of the cab 3 of the truck 1 at the left side thereof, and a rear signal box 4 mounted in any suitable manner at the rear and preferably adjacent the top of the body 5 of said truck.

The signalling arm 2 is tubular with a transparent pointing hand 6 fixed on one end thereof by a threaded cuff 7 and has a counterweight 8, preferably of ornamental design, fast on the other end thereof. An electric light 9 is suitably secured in the signalling arm 2 to extend into and illuminate the hand 6.

The mounting for the signalling arm 2 includes a tubular column 10 upstanding at the left side of the truck 1 in front of the cab 3 with an upper end gear box 11 thereon and a lower end gear box 12 on the same fixed in any suitable manner to the left side of the truck 1. A bracket 10' secures the column 10 to said side of the truck 1. A hollow, lateral stub shaft 13 on said arm 2 adjacent the counterweighted end thereof is journaled in the upper end gear box 11 to extend forwardly out of the same and whereby the signalling arm 2 is swingable vertically in front of the column 10 in a plane transverse to the truck 1.

The signalling arm 2 is swingable upwardly from a normal pendant position in which it hangs parallel with the column 10 and into caution, left-turn, and right-turn signalling positions, respectively. In its caution-signalling position, the signalling arm 2 is inclined downwardly and outwardly of the truck 1. In its left-turn signalling position, said arm 2 is horizontal and extended away from the truck 1. In its right-turn signalling position, said arm 2 extends upwardly. The normal, caution, and right-turn signalling positions of the signalling arm 2 are shown in dotted lines in Figure 3, and the left-turn signalling position in full lines.

Operating mechanism for swinging the signalling arm is provided which preferably comprises the following. A hollow rotary shaft 15 is journaled in suitable brackets 16 on the steering post column 17 of the truck to extend alongside said column parallel therewith at the left side thereof. A hand lever 18 is suitably fixed at one end thereof on the upper end of the hollow shaft 15 directly beneath the steering wheel 19 of the truck 1 to extend laterally of said shaft 15 and be conveniently grasped by the hand of the driver. A hollow hand-grip 20 on the outer end of the hand lever 18 provides for grasping the same.

The hand lever 18 extends across and is swingable around and over the raised rim 21 of a detent sector 22 concentric to the hollow shaft 15 and bolted, as at 23, to said column 17 in a plane parallel with said lever 18. A bottom notch 24 in the hand lever 18 straddles the raised rim 21. A series of four detent notches 25, 26, 27, 28, respectively, in the raised rim 21 are spaced apart around the same for coaction with a detent bar 29 in the hand lever 18 to lock said lever in four positions in which the signalling arm 2 is swung into normal, caution, left-turn, and right-turn signalling positions, respectively, in a manner presently seen.

The detent bar 29 is endwise slidable through the hand-grip 20 and in a bore 30 in the hand lever 18 with an outer end knob 31 thereon for moving the same outwardly of said hand-grip 20 into a releasing position in which its inner end is spaced outwardly of the rim 21 and said bar is in releasing position with the hand lever 18 unlocked, as shown in dotted lines in Figure 8. The detent bar 29 has its lower edge exposed through the notch 24 so that when said bar 29 is slid inwardly it will extend through the selected notch 25, 26, 27, 28 to lock said hand lever to the said sector 22.

A coil spring 32 in the hand-grip 20 bearing against a collar 33 on the detent bar 29 urges said bar 29 inwardly into the selected notch 25, 26, 27, 28 to lock said hand lever 18 when the knob 31 is released. The knob 31 is moved outwardly by a hand on the hand-grip 20, as will be clear.

The hollow shaft 15 is operatively connected by bevel gearing 35, 36 to one end of a horizontal hollow jack shaft 37 suitably mounted in the cowl 38 of the truck 1 in a bearing tube 38' to extend out of said cowl with its other end projecting into the before-mentioned lower end gear box 12 in which it is operatively connected by bevel gearing 39, 40 to a vertical shaft 41 journaled in the hollow column 10 and operatively connected by bevel gearing 42, 43 in the upper end gear box 11 to the stub shaft 13. The jack shaft 37 and vertical shaft 41 are hollow, for a purpose presently apparent.

A housing 45 is provided for enclosing the hand 6 in the normal position of the signalling arm 2. The housing 45 is of vertically elongated form and mounted by suitable brackets 46 on the column 10 in upstanding position in front thereof at a suitable location for receiving therein the hand 6. The housing 45 has a tapered lower end 47 and a convex inboard side 48 and front 49 for streamline purposes and is open at its outboard side, as at 50, above the lower end 47 for swinging of the hand 6 into and out of said housing. The top 51 of the housings 45 is slotted, as at 52, from the outboard side of the housing to accommodate the signalling arm 2 above the hand 6. A pair of doors 53 are hinged, as at 54, above said end 37 to opposite vertical edges of the housing 45 to open and close said housing on its outboard side.

A pair of shutters 55 of elongated, substantially rectangular form and for closing the slot 52 are pivoted, as at 56, adjacent front ends thereof to the top edges of the doors 53, in horizontal position, and are also pivoted together, as at 57, adjacent the other ends thereof in overlying sliding relation to the top 51 and slot 52 of said housing 45, the arrangement being such that when said doors 53 are swung open, the shutters 55 will slide on said top 51 toward the outboard side of the housing 45 and open into divergent relation to permit the signalling arm 2 to swing inwardly of the housing 45 into the slot 52 and in between said shutters 55. A pair of confronting, arcuate, edge notches 58 in longitudinal sides of the shutters 55 fit around the signalling arm 2 when the shutters 55 are closed. When the signalling arm 2 swings into the slot 52, initially, it abuts the edges of the notches 58 and slides the shutters 55 toward the inboard side of the housing 45 on top thereof, causing the doors 53 to close when the hand 6 has fully entered said housing 45.

Swinging movement of the doors 53 into closing position, and by means of the pivots 56, causes the shutters 55 to close around the signalling arm 2 above the hand 6 and to close the slot 52, as shown in Figure 7.

A U-shaped wire spring 59 with its ends pivoted on the pivots 56, and which straddles the signalling arm 2, overlies the shutters 55, horizontally, and normally swings the doors 53 open whereby said shutters 55 are normally opened, as shown in Figure 6.

A resilient bumper panel 60 in the housing 45 cushions the hand 6 when it is swung completely into said housing. The doors 53 abut in obtuse angled relation, as shown in dotted lines in Figure 7, to streamline the outboard side of said housing when said doors are closed.

The rear signal box 4 comprises a transparent center, caution signal 65, and transparent left and right-turn signals 66, 67. Electric lights 68, 69, 70 suitably mounted in said box 4 provide for illuminating said caution and left- and right-turn signals 65, 66, 67, respectively.

For energizing the electric lights 9, 68, 69, 70, the following means is provided. A series of four resilient contact brushes 75, 76, 77, 78, respectively, are suitably fixed on an insulation plate 79 on said column 17 to extend laterally therefrom in vertically spaced parallel relation over a control cylinder 80 suitably fixed on the hollow shaft 15 intermediate the ends of said shaft to be rotated thereby.

An arcuate conductor plate 81 is fixed on the cylinder 80 for rotation into wiping engagement with ball ends 82 on said brushes 75, 76, 77, 78. The conductor plate 81 is provided with a stepped leading vertical edge 83, designed so that when said plate is rotated in one direction, said edge will engage the brushes 75, 76, 77, 78 successively.

A conductor cable 84 extends from one side of a suitably grounded battery 85, which may be the ignition battery of truck 1, and is connected to one terminal 86 of a fuse 87 fixed by a bracket 88 on the column 17. A movable contact 89 carried by an insulation plate 90 on the free end of a leaf spring 91 is normally held by said spring engaged with the other terminal 92 of said fuse 87, and is connected by a conductor cable 93 to the brush 75 so that the conductor plate 81 will be energized when rotated into engagement with said brush 75. The leaf spring 91 is flexible to disengage the movable contact 89, by means and for a purpose presently described, and bolted as at 91' to said tube 38'.

A conductor cable 94 extends from the brush 76 to one side of the electric light 9, the other side of which is connected by a lead 95 to a telltale light 96 on a panel 97 adapted to be suitably fixed, in a manner not shown, in the cab 3. The conductor cable 94 extends freely through the bevel gear 36, jack shaft 37, bevel gears 39, 40, lower end gear box 12, column 10, upper gear box 11, bevel gears 42, 43 and stub shaft 13, and into the signalling arm 2 to the electric light 9.

A conductor cable 98 also extends from the brush 76 to one side of the electric light 68 for illuminating the caution signal 65 in the rear end signal box 4, the other side of said light 68 being connected by a lead 99 to a suitably grounded telltale light 100 on the panel 97. Thus, as will be clear, when the conductor plate 81 is engaged with the brush 76, the electric lights 9 and the rear caution signal 68 will be illuminated at the same time.

A conductor cable 101 extends from the brush 77 to one side of the electric light 69, the other side of which is connected by a lead 102 to another suitably grounded telltale light 103 on said panel 97, so that when the conductor plate 81 is rotated into engagement with the brush 77 the left-turn signal 66 in the rear signal box 4 will be illuminated along with light 9.

Another conductor cable 104 leads from the brush 78 to one side of the electric light 70 which is connected on its other side by a lead 105 to another telltale light 106 on said panel 97.

A pull rod 110 is slidably extended through the hollow shaft 15 with its lower end operatively connected, as at 111, to the free end of the leaf spring 91 so that upward movement of said rod will disengage the movable contact 89 from the terminal 92 of the fuse 87. A lever 112 carried by the hand lever 18 is pivoted on said lever 18, as at 113, and operatively connected to the upper end of the pull rod 110, as at 114, the arrangement being such that a hand may grasp the hand-grip 20 and said lever 112, and by squeezing against said lever 112 intermittently, in opposition to the leaf spring 91, cause intermittent breaking of the circuit at the fuse 87 for a purpose presently clear.

Referring now to the operation of my invention, with the hand lever 18 locked to the said sector 22 at the notch 25, the signalling arm 2 is in normal pendant position, as best shown in dotted lines in Figure 3, with the hand 6 in the housing 45. The doors 53 and shutters 55 are closed, as best shown in Figures 1 and 7, and held closed by said arm 2 in a manner which will be apparent. The stepped edge 81 of the conductor plate 83 is engaged with the brush 75 so that said plate 83 is electrically connected to the battery 85 through the means already described. By swinging the hand lever 18, clockwise as viewed in Figure 5, to the notches 26, 27, 28, the signalling arm 2 will be swung out of the housing 45 into caution, left-turn and right-turn signalling positions, previously described, and may be locked in such positions by locking said hand lever 18 at said notches 26, 27, 28 by means of the detent bar 29, under control of the knob 31. As will be understood, the signalling arm 2 will be swung by rotation of said shaft 15 in different degree whereby said arm will be correspondingly swung by operation of the bevel gears 35, 36, jack shaft 37, bevel gears 39, 40, shaft 41, bevel gears 42, 43, and stub shaft 13. Such rotation of said shaft 15 in different degree will correspondingly rotate the conductor plate 81 so that when the signalling arm 2 is in caution-signalling position, the stepped edge 83 of the conductor plate 81 will engage the brush 76 and when said arm is in left-turn signalling position, said stepped edge 83 will engage the brush 77, whereas when said arm 2 is in right-turn signalling position, said edge 83 of the conductor plate 81 will engage the brush 78. As we have already seen, with the brush 76 engaged by the plate 81, the electric light 9 in the hand 6 will be energized by the conductor cable 94, while at the same time the electric light 68 will be energized through the conductor cable 98 to illuminate the caution signal 65 in the rear end signal box so that a rear end caution signal will be displayed while the signalling arm 2 signals caution at the front of the automobile. Also, as will now be clear, when the brush 77 is engaged by said plate 81, the electric light 69 will be energized through the cable 101 to illuminate the left-turn signal 66 in the rear end signal box 4, while the hand 6 is maintained illuminated in the left-turn signalling position of said arm 2 and the caution signal 65 in said box 4 is likewise maintained illuminated by continued engagement of said plate 81 with the brush 76. Lastly, when the brush 78 is engaged by said plate 81, the electric light 70, through the conductor cable 104, will be energized to illuminate the right-turn signal 67 in the rear end signal box 4, in the right-turn signalling position of the signalling arm 2, while the electric light 9 in the hand 6 and the electric light 68 for the caution signal 65 in said box 4 will be illuminated by continued engagement of said plate 81 with the brush 76. When the brush 78 is engaged by said plate 81, the brush 77 will ride off said plate 81 into a notch 115 in said plate, and shown in Figure 12, so that the left-turn signal 66 in said box 4 will not be illuminated while the right-turn signal 67 in said box is illuminated. By operating the lever 112, in the manner already described, the flow of electric current from the battery 85 may be intermittently interrupted for flash illumination, or signalling, of any of the described signals. As will be seen, with each of the turn signals, the caution signal 65 at the rear end of the vehicle is given as well as when the hand 6 is illuminated in the caution-signalling position of the signalling arm 2. The caution signal 65 may display the word "Look" to attract attention.

A suitable guard 116 bolted to the steering column 17, as at 117, may be provided for circumscribing the cylinder 80, conductor plate 81 and brushes 75, 76, 77, 78 for protective purposes.

The telltale lights 96, 100, 103, 106 serve the usual purpose and form, per se, no part of my invention.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claims.

Having described my invention, what is claimed as new is:

1. Signalling apparatus for use on an automobile comprising a front signalling arm pivotally mounted on said automobile for vertical swinging from a normal pendant position into caution, and left- and right-turn signalling positions, respectively, and terminating in a transparent direction pointing hand, rear transparent caution and left- and right-turn signals on said automobile, manually operative rotary means for swinging said arm into its signalling positions selectively, and rotary means operative by the first-named means to illuminate said hand in the selected position of said arm together with the rear signal corresponding to the signal indicated by the selected position of said arm.

2. Signalling apparatus for use on an automobile comprising a front signalling arm pivotally mounted on said automobile for vertical swinging from a normal pendant position into caution, and left- and right-turn signalling positions, respectively, and terminating in a transparent direction pointing hand, rear transparent caution and left- and right-turn signals on said automobile, manually operative rotary means for swinging said arm into its signalling positions selectively, rotary means operative by the first-named means to illuminate said hand in the selected position of said arm together with the rear signal corresponding to the signal indicated by the selected position of said arm, and manual means for causing said last means to operate intermittently for flash illumination of said hand and any selected rear signal.

3. Signalling apparatus for use on an automobile comprising a front signalling arm pivotally mounted on said automobile for vertical swinging into and from a normal pendant position, a housing for containing said hand when said arm is swung into normal position, and having a top slot adapted to be entered by said arm to provide for the hand entering said housing, one side of said housing having an opening therein by means of which said hand may enter the housing when said arm has entered said slot, and means for closing said opening and slot to confine said arm in said slot and said hand in said housing operative by said arm entering said slot.

4. Signalling apparatus for use on an automobile comprising a front signalling arm pivotally mounted on said automobile for vertical swinging into and from a normal pendant position, a housing for containing said hand when said arm is swung into normal position, and having a top slot adapted to be entered by said arm to provide for the hand entering said housing, one side of said housing having an opening therein by means of which said hand may enter the housing when said arm has entered said slot, and means for closing said opening and slot to confine said arm in said slot and said hand in said housing operative by said arm entering said slot and comprising a pair of normally open shutters operative by engagement of said arm therewith to close the slot.

5. Signalling apparatus for use on an automobile comprising a front signalling arm pivotally mounted on said automobile for vertical swinging into and from a normal pendant position, a housing for containing said hand when said arm is swung into normal position, and having a top slot adapted to be entered by said arm to provide for the hand entering said housing, one side of said housing having an opening therein by means of which said hand may enter the housing when said arm has entered said slot, and means for closing said opening and slot to confine said arm in said slot and said hand in said housing operative by said arm entering said slot and comprising a pair of normally open shutters operative by engagement of said arm therewith to close the slot, and a pair of doors operative by said shutters to close said opening.

6. Signalling apparatus for use on an automobile comprising a front signalling arm terminating in a transparent hand and pivotally mounted on said automobile for vertical swinging into different signalling positions, means for swinging said arm comprising a rotary shaft journaled in said automobile and having a hand lever on one end thereof for rotating the same, an electric light in said hand for illuminating the same, a series of rear signals on said automobile, electric lights for illuminating said rear signals, an electric circuit on which said lights are interposed, and means operative by rotation of said shaft to close the circuit to the first-mentioned light in any signalling position of said arm and also to different lights of the series in the different signalling positions of said arm.

7. Signalling apparatus for use on an automobile comprising a front signalling arm terminating in a transparent hand and pivotally mounted on said automobile for vertical swinging into different signalling positions, means for swinging said arm comprising a rotary shaft journaled in said automobile and having a hand lever on one end thereof for rotating the same, an electric light in said hand for illuminating the same, a series of rear signals on said automobile, electric lights for illuminating said rear signals, an electric circuit in which said lights are interposed, and means operative by rotation of said shaft to close the circuit to the first-mentioned light in any signalling position of said arm and also to different lights of the series in the different signalling positions of said arm comprising a control cylinder on said shaft rotatable thereby into different positions coincident to swinging of said arm into different positions, a series of fixed brushes, and an arcuate conductor plate on said cylinder rotatable thereby and having a stepped edge for engaging said brushes successively when said cylinder is rotated into said different positions.

8. Signalling apparatus for use on an automobile comprising a signalling arm terminating in a transparent hand and pivotally mounted on said automobile for vertical swinging into different signalling positions, means for swinging said arm comprising a rotary hollow shaft journaled on said automobile and provided with a hand lever on one end thereof for rotating the same, operating connections between the other end of said shaft and said arm, an electric light on said hand for illuminating the same, a normally open electric circuit in which said light is interposed, means operative by rotation of said shaft to close circuit to said light in the different signalling positions of said arm, a second lever pivoted on the hand lever, a rod slidably extended through said shaft and endwise movable in one direction by operation of said second lever, and means operative by endwise movement of said rod to open the circuit at will after closing by the second-mentioned means to provide for flashing of said light and flash illumination of said hand.

WALTER V. DYE.

REFERENCES CITED

The following references are of record in the file of this patent:

UNITED STATES PATENTS

| Number | Name | Date |
|---|---|---|
| 1,749,690 | Bearland | Mar. 4, 1930 |
| 2,008,051 | Waldman | July 16, 1935 |
| 2,055,402 | Colla et al. | Sept. 22, 1936 |
| 2,081,805 | Eskilson et al. | Feb. 28, 1939 |